United States Patent [19]
Suter

[11] Patent Number: 5,975,479
[45] Date of Patent: Nov. 2, 1999

[54] FISHING ROD HOLDER

[76] Inventor: Bo Suter, 2750 Sierra Sunrise Ter., No. 424, Chico, Calif. 95928

[21] Appl. No.: 09/197,786

[22] Filed: Nov. 23, 1998

[51] Int. Cl.$^6$ .................................................. A01K 97/10
[52] U.S. Cl. ........................................... 248/534; 43/21.2
[58] Field of Search .............................. 43/21.2; 248/534, 248/538, 520, 500

[56] References Cited

U.S. PATENT DOCUMENTS

| | | | |
|---|---|---|---|
| 3,089,674 | 5/1963 | Bastie ...................................... | 248/514 |
| 4,236,339 | 12/1980 | White .......................................... | 43/17 |
| 4,366,640 | 1/1983 | Clapp ....................................... | 43/21.2 |
| 4,517,761 | 5/1985 | Bleggi . | |
| 4,640,038 | 2/1987 | Jershin ........................................ | 43/17 |
| 4,674,222 | 6/1987 | Hughes ..................................... | 43/21.2 |
| 4,730,408 | 3/1988 | Miller ........................................ | 43/15 |
| 5,088,224 | 2/1992 | Gutierrez . | |
| 5,247,759 | 9/1993 | Noriega . | |
| 5,295,321 | 3/1994 | Matura . | |
| 5,341,589 | 8/1994 | Gutierrez . | |
| 5,355,610 | 10/1994 | Sizemore et al. . | |
| 5,501,028 | 3/1996 | Hull et al. . | |

Primary Examiner—Thomas Price
Assistant Examiner—James S. Bergin
Attorney, Agent, or Firm—Lothrop & West

[57] ABSTRACT

A gunwale mounted fishing rod holder comprising an inboard arm to support the butt end of a rod and an outboard arm to support the reel portion thereof. The improvement involves the addition of a latching structure which securely encloses the butt end of the rod while the baited line is in the water but which opens when the user grasps the rod and lifts it in the event of a strike. The continuous upward movement of the rod saves time and allows the user to set the hook more quickly than when it is first necessary to shift the rod in an outboard direction before the rod can be lifted out of the holder.

3 Claims, 2 Drawing Sheets

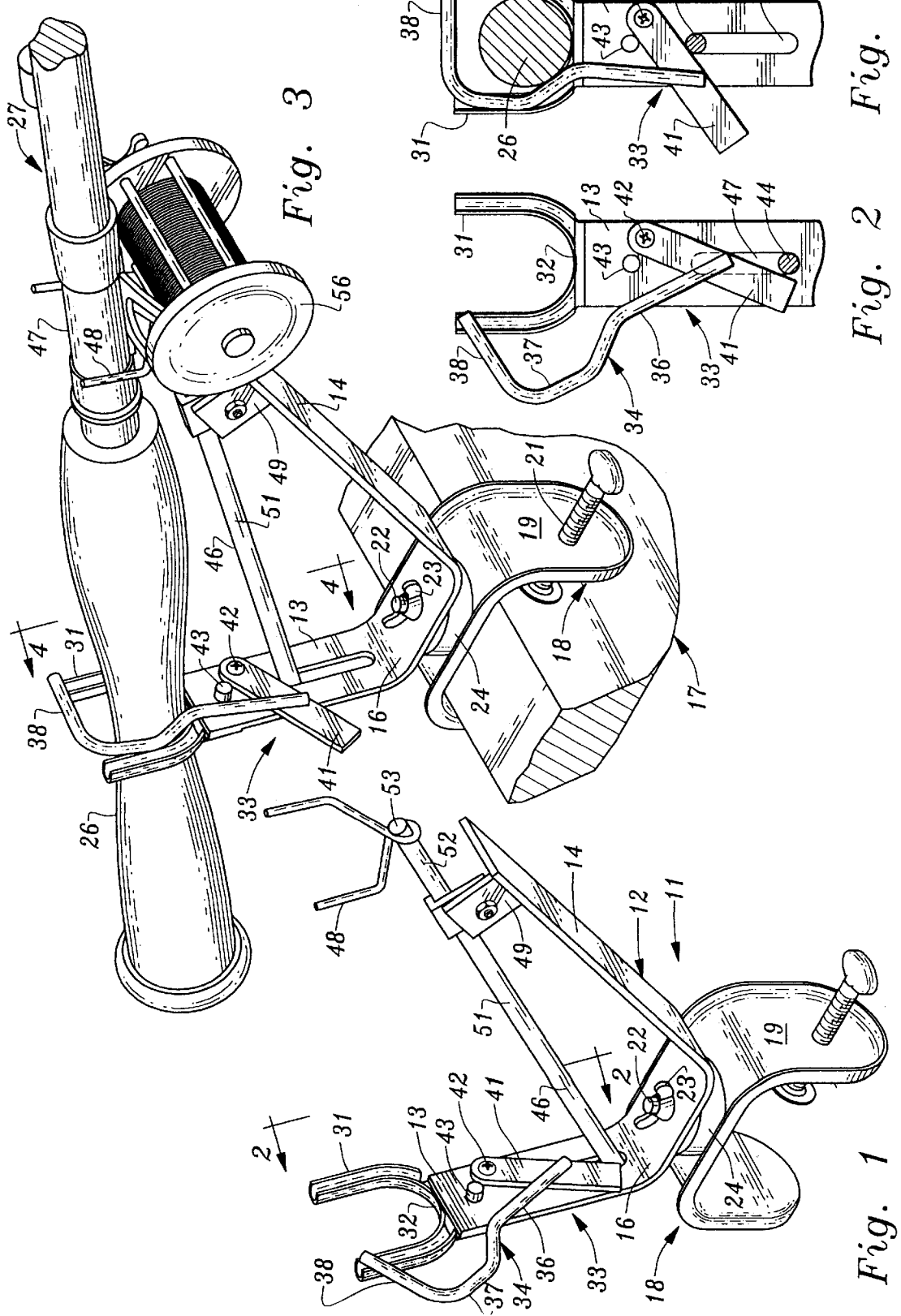

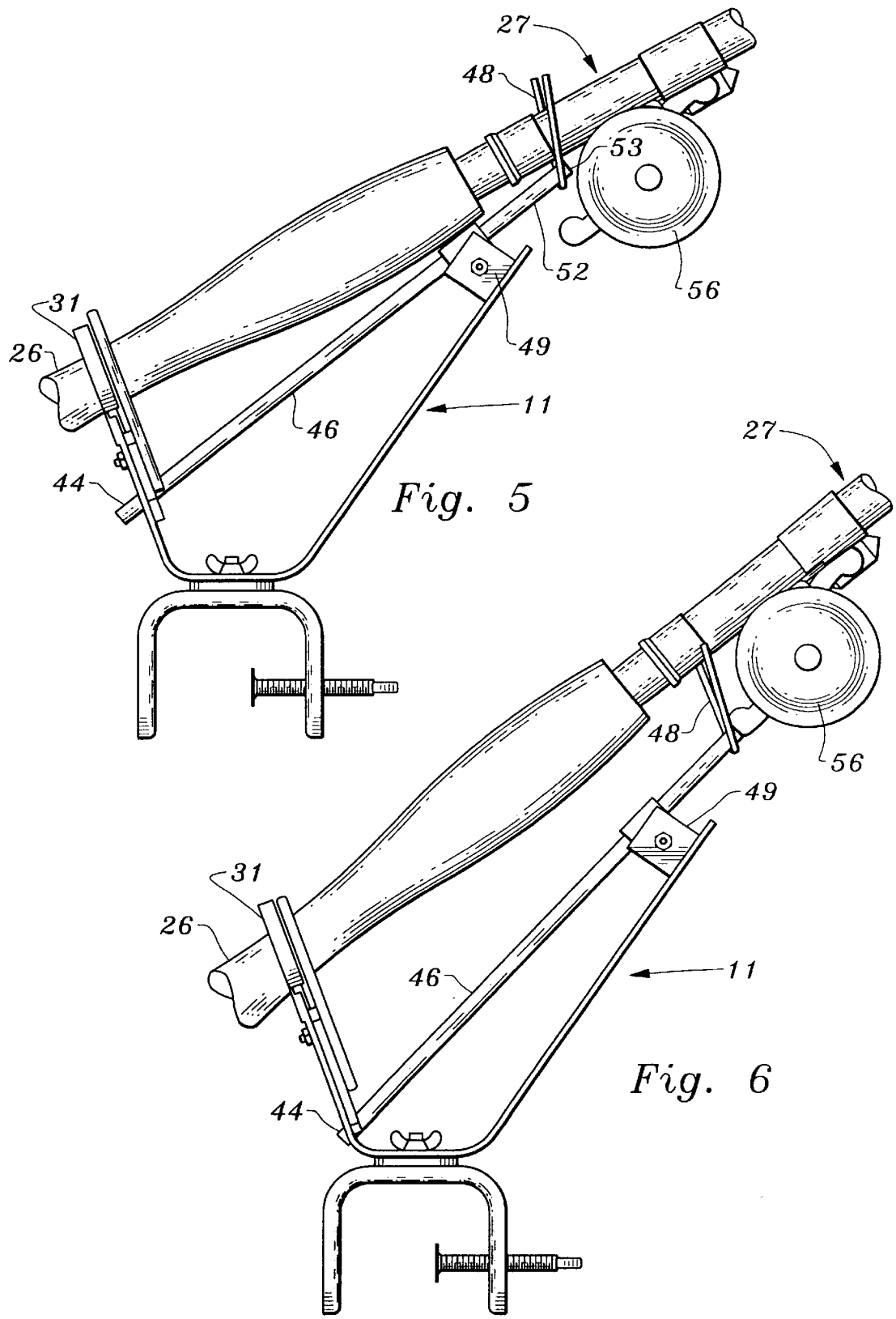

FISHING ROD HOLDER

BACKGROUND OF THE INVENTION

1. Field of the Invention

The invention relates generally to holders for sport-fishing rods and, more particularly, to fishing rod holders removably attached to the gunwale of a small boat.

2. Description of Prior Art

A fishing rod holder is a convenient accessory since it enables the user to keep a baited hook in the water while the rod and reel are securely positioned even though not being held by the user. When a fish strikes the bait the tip of the rod is deflected downwardly and, depending upon the reel brake setting and severity of the strike, a short length of the fishing line might be unreeled, with attendant reel whine, or other sound. These visible and audible signals alert the fisherman/fisherwoman who moves quickly to grasp the rod and dislodge it from the holder in order to set the hook and play the fish.

The problem with prior art fishing rod holders known to applicant is that in order to dislodge the rod it is first necessary to translate the rod forwardly far enough so that the butt end clears the inboard cradle of the holder, thereby allowing the rod to be lifted and placed in full control of the user. Critical time is often lost.

The present rod holder overcomes this problem and allows the user to grip the rod and lift it out of the holder in one continuous upward motion. Valuable time is saved; time which allows the hook to be set before the fish disgorges the bait.

A preliminary search of prior patent art turned up the following seven references: Bleggi U.S. Pat. No. 4,517,761; Gutierrez U.S. Pat. No. 5,088,224; Noriega U.S. Pat. No. 5,247,759; Matura U.S. Pat. No. 5,295,321; Gutierrez U.S. Pat. No. 5,341,589; Sizemore et al. U.S. Pat. No. 5,355,610; and Hull et al. U.S. Pat. No. 5,501,028. Copies of these patents will be provided with an Information Disclosure Statement. A review of these seven publications leads applicant to believe that none of them, taken distributively, anticipates applicant's claimed invention, or, taken in combination, renders applicant's claimed invention obvious.

SUMMARY OF THE INVENTION

A generally U-shaped framework, having an outboard arm and an inboard arm, is provided with a clamp to secure the framework to the gunwale of a fishing boat. The inboard arm includes an upwardly opening fixed cradle capable of supporting the butt portion of a fishing rod. The reel carrying portion of the fishing rod is supported on a yoke mounted on the outboard end of a vertically rockable lever pivotally mounted on the outboard arm of the framework. The lever extends from the yoke to the pivot, thence to and into a vertical slot formed in the inboard arm.

The portion of the lever extending from the pivot to the slot weighs substantially more than the yoke to pivot portion, the result being that gravity urges the inboard end of the lever toward the bottom of the slot and the yoke toward an upper location when the fishing rod is not in the holder.

When however, the fishing rod is positioned so that the butt portion is in the fixed cradle and the reel portion is in the yoke, the considerably greater weight of the reel portion causes the yoke-to-pivot section of the lever to exceed the weight of the pivot-to-inboard-end section of the lever, thereby causing the lever to tilt in the opposite angular direction, i.e. with the inboard end of the lever rising toward the top of the slot.

The upward urgency of the inboard end portion of the lever forcibly impinges against an overlying actuator bar pivotally mounted at one end on the inboard arm of the framework, thereby urging the opposite free end of the bar in an upward angular direction. A latch hook is mounted on the free end of the bar at a predetermined attitude such that as the free end of the bar is elevated by the inboard end of the lever, the latch swings over the open top of the cradle and encloses the butt portion of the fishing rod.

When a fish strikes the baited hook, the latch hook is substantially instantaneously disengaged by grasping the portion of the fishing rod located above the gunwale clamp and tilting the outboard portion of the rod upwardly out of the yoke using the bottom of the fixed cradle as a pivot point. This maneuver allows the lever to resume its initial attitude, with the inboard end of the lever at the bottom of the slot, the bar in lowermost position and the latch hook clear of the cradle. The butt end of the fishing rod can then be lifted vertically out of the cradle, allowing the user to set the hook and reel in the fish. Although the sequence of events takes time to describe, the latch hook disengages so quickly in actual operation that the fishing rod is released almost simultaneously with grasping the rod and tilting the tip upwardly while maintaining tautness in the fishing line.

BRIEF DESCRIPTION OF THE DRAWING FIGURES

FIG. 1 is a front perspective view, showing the holder components in unloaded position;

FIG. 2 is a front elevational view taken on the plane indicated by the line 2—2 in FIG. 1, the lever being shown in section;

FIG. 3 is a front perspective view, similar to FIG. 1, but with the holder clamped to the gunwale of a fishing boat and with a fishing rod positioned in the holder with the butt end portion of the rod supported on the cradle and enclosed by the latch hook component of the holder;

FIG. 4 is a front elevational view, taken on the plane indicated by the line 4—4 in FIG. 3, the lever and the butt end portion of the fishing rod being shown in section;

FIG. 5 is a side elevational view of the holder and fishing rod in closed, or latched position, corresponding to FIG. 3; and, FIG. 6 is a view comparable to FIG. 5 but with the latch hook in open position, ready for the fishing rod to be vertically removed from the holder in order to set the hook.

DETAILED DESCRIPTION OF A PREFERRED EMBODIMENT

The fishing rod holder of the invention, designated by the reference numeral 11, comprises a generally U-shaped framework 12 including an inboard arm 13 and an outboard arm 14 connected by a base 16.

In its customary environment, namely, on a sport fishing boat, the holder 11 is mounted on the boat's gunwale 17. A convenient and reliable mounting structure comprises a clamp 18 having a C-shaped bracket 19 adapted to fit over the gunwale 17 and to be removably secured thereto by a suitable threaded fitting 21. The base 16 of the framework 12 is attached to the bracket 19 by a fastening, such as a bolt 22 and wing nut 23 together with an intervening washer 24.

The inboard arm 13 of the framework 12 is structured to form a support for the butt end portion 26 of a fishing rod 27, of which only the lower fraction is disclosed in the drawing figures. The support for the butt end portion 26 of the rod 27 comprises a fixed, U-shaped cradle 31 mounted on the upper end 32, or top end, of the inboard arm 13.

FIGS. 1 and 2 clearly disclose the construction as well as the initial and terminal relative positions of the inboard arm 13 and the latch hook mechanism 33 which serve to enclose the butt portion of the rod when the rod is installed in operative position in the holder, awaiting a strike by a fish on the baited hook (not shown).

In other words, in both initial and terminal placement of the latch hook components 33 the fixed, U-shaped cradle 31 opens upwardly, ready either to receive and support the butt of the rod or for the butt of the rod to be lifted out of the cradle 31 when a strike occurs.

FIGS. 3 and 4, on the other hand, show the placement of the latch hook components 33 when the butt end portion of the rod is latchably enclosed in the cradle 31.

One of the key components of the latching mechanism 33 is a latch hook 34, shaped somewhat like a reversed question mark and including a shank 36 and a bale 37 ending in a gate 38.

The gate 38 moves between initial, or open, position, shown in FIG. 2, to closed position, shown in FIG. 4 and back to terminal, open position, shown in FIG. 2, in response to movement of a latch actuator bar 41 rotatably mounted on a pivot pin 42 secured to the upper end portion of the inboard arm 13.

The bar 41 rocks, or swings, between two extreme positions, namely, a lowermost position, as best appears in FIGS. 1 and 2, and an uppermost position as best shown in FIGS. 3 and 4. The uppermost position is established by a limit stop pin 43 protruding from the inboard arm 13 and the lowermost position by abutment of the actuator bar 41 with the inboard lower end portion 44 of a lever 46 when the inboard end portion 44 of the lever 46 is located at the bottom of its travel in a vertical slot 47 in the inboard arm (see FIG. 2).

In other words, when the fishing rod 27 is placed in the empty holder, the butt end portion 26 of the rod is supported on the bottom of the fixed, U-shaped cradle 31 and the reel portion 47 of the rod is supported in a V-shaped yoke 48 mounted on the outboard end of the lever 46.

As most clearly appears in FIGS. 1, 5 and 6, the lever 46 is rotatably mounted on a pivot 49 and the length of the lower lever section 51 (between the pivot 49 and the inboard lower end portion 44) of the lever 46 considerably exceeds the upper lever section 52 (between the pivot 49 and the outboard upper end portion 53 of the lever 46). The weight of the wire yoke 48 is practically negligible; thus, gravity tends to urge the longer (and heavier) lever section 51 downwardly, thereby causing the shorter lever section 52 to tilt upwardly when the rod holder is empty, as clearly shown in FIGS. 1 and 2.

When, however, the baited hook is lowered into the water and the rod is lowered into position, with the reel 56 located outboard of the yoke 48, the weight distribution on opposite sides of the pivot 49 is reversed and the lower inboard end portion 44 of the lever is urged upwardly.

As the lever portion 44 ascends, it abuts the rotatable latch actuator bar 41, previously described, and causes the bar to swing angularly upwardly, causing the latch hook gate 38 to close, thereby preventing the butt end of the rod, from lifting out of the cradle in the event of a strike.

When a strike occurs, the tip of the rod is deflected downwardly and, ordinarily, at least a few inches of fishing line are unreeled. The length of line pulled off the reel depends upon the severity of the strike and the amount of brake set on the reel.

In any event, the user is alerted both by the rod tip motion and the sound, usually a whining or clicking sound, made by the reel. Swift action is called for at this juncture. Any undue delay in removing the rod from the holder and "setting the hook" could result in the fish's disgorging the hook.

In the prior art devices known to applicant, it has been necessary, after grabbing the rod, to translate the rod in an outboard direction so as to disengage the butt end of the rod from a ring, or comparable restraining device on the inboard portion of the rod holder. After the butt end of the rod is clear, the rod can be lifted vertically and the fish can be played. The extra two or three seconds needed to clear the rod from the holder is often enough time for the fish to sense and disgorge the hook.

With the present holder, on the other hand, the user need only grip the portion of the rod located above the gunwale clamp, maintain tension on the fishing line by tilting the rod tip upwardly a slight amount, using the bottom of the fixed U-shaped cradle as a pivot, then lifting the rod out of the holder and begin playing the fish. The instant the reel portion of the rod is lifted out of the V-shaped yoke, the latch hook opens and allows the butt end portion of the rod to be vertically removed from the U-shaped cradle.

With a little practice even a novice user is able, in one swinging upward motion, to transfer the rod from the holder to fully operational position in the user's arms and hands.

I claim:

1. A fishing rod holder comprising:

a. a generally U-shaped framework having an outboard arm and an inboard arm, said arms including lower ends extending upwardly from a base and terminating in upper ends;

b. a bracket for clamping said base to the gunwale of a fishing boat with said framework oriented so that said outboard arm faces outwardly and said inboard arm faces inwardly;

c. a lever pivotally mounted on said outboard arm for rocking movement in a vertical plane, said lever extending from an outboard upper end above said upper end of said outboard arm to an inboard lower end located within a vertical slot in said inboard arm, the portion of said lever between said outboard upper end and the pivot weighing less than the portion of said lever between the pivot and said inboard lower end so that in unloaded condition of said holder, said lower inboard end of said lever is located at the bottom of said slot;

d. an upwardly opening U-shaped cradle mounted on said upper end of said inboard arm to support the butt end portion of a fishing rod;

e. an upwardly opening yoke mounted on said outboard upper end of said lever to support the reel portion of the fishing rod, the weight of said reel portion of the rod substantially exceeding the inboard portion of said lever so that when the fishing rod is installed in the rod holder, said inboard lower end of said lever is urged from a bottom position in said slot to an elevated position; and, f. latch means on said inboard arm in interfering relation with said inboard lower end of said lever for respectively covering and uncovering the upward opening of said cradle in dependence upon the upward movement of said inboard lower end of said lever and the downward movement of said inboard lower end of said lever.

2. A fishing rod holder as in claim 1 in which said latch means includes an actuator bar pivotally mounted on said inboard arm in interfering relation relative to said lever, and a latch gate mounted on said actuator bar for movement between a first, open position when said inboard lower end of said lever is in said bottom position and a second, closed position covering the open upper end of said cradle when said inboard lower end of said lever is in an elevated position.

3. In an improved fishing rod holder having a generally U-shaped framework formed by a base capable of being removably attached to the gunwale of a small boat with the two arms of the framework oriented transversely to the gunwale and defining an inboard arm and an outboard arm, the improvement comprising:

a. a lever tiltably mounted on a pivot secured to said outward arm for movement in a vertical plane intersecting said arms, said lever extending from an outboard end located in the vicinity of the top of the outboard arm to an inboard end located in the bottom of a vertical slot in the inboard arm, the weight of the portion of said lever inboard of said pivot exceeding the weight of the portion of said lever outboard of said pivot;

b. an upwardly opening U-shaped cradle mounted on the top of the inboard arm, and adapted to support the butt end of a fishing rod;

c. an upwardly opening yoke mounted on the outboard end of said lever to receive the reel carrying portion of the fishing rod, the weight of the reel carrying portion substantially exceeding the difference in weight of the inboard and outboard lever portions so that when the rod is installed in the holder, said lever is tilted in an angular direction such that the inboard end thereof is urged in an upward direction in said slot;

d. a latch including an actuator bar pivotally mounted at one end on the inboard arm, said actuator bar including a portion disposed in interfering relation with said inboard end of said lever so that said actuator bar portion is swung upwardly as said inboard end of said lever is tilted upwardly, said latch further including a latch hook having a latch gate movable with said actuator bar and shaped to close off the upward opening of said cradle when in an elevated position with said inboard end of said lever and said actuator bar, said inboard end of said lever, said actuator bar and said latch hook descending to open said latch gate when the superposed excess weight of said reel portion of the rod is removed from said yoke.

* * * * *